US006430692B1

(12) United States Patent
Kimble et al.

(10) Patent No.: US 6,430,692 B1
(45) Date of Patent: Aug. 6, 2002

(54) SERIES-PARALLEL BATTERY ARRAY CONVERSION

(75) Inventors: Christopher John Kimble, Pine Island; Steven William Steele, Rochester, both of MN (US)

(73) Assignee: International Business Machines, Corporation, Armonk, NY (US)

( * ) Notice: Subject to any disclaimer, the term of this patent is extended or adjusted under 35 U.S.C. 154(b) by 0 days.

(21) Appl. No.: 09/160,242

(22) Filed: Sep. 25, 1998

(51) Int. Cl.$^7$ .............................. G06F 1/26; G06F 1/28; G06F 1/30
(52) U.S. Cl. ......................... 713/300; 307/66; 307/75; 320/16; 320/117; 320/120; 320/121; 320/122; 320/124; 320/136; 320/139; 320/162
(58) Field of Search ........................ 713/300; 307/66, 307/75; 320/16, 120, 121, 122, 136, 139, 117, 162, 124; 363/21; 323/210

(56) References Cited

U.S. PATENT DOCUMENTS

| | | | | |
|---|---|---|---|---|
| 3,886,426 A | * | 5/1975 | Daggett | 320/117 |
| 3,923,116 A | * | 12/1975 | Thompson et al. | 180/65.8 |
| 4,143,283 A | * | 3/1979 | Graf et al. | 307/66 |
| 4,956,618 A | * | 9/1990 | Ulmer | 331/116 |
| 5,002,840 A | * | 3/1991 | Klebenow et al. | 429/9 |
| 5,155,289 A | * | 10/1992 | Bowles | 89/8 |
| 5,160,851 A | * | 11/1992 | McAndrews | 307/66 |
| 5,225,761 A | * | 7/1993 | Albright | 320/117 |
| 5,396,165 A | * | 3/1995 | Hwang et al. | 323/210 |
| 5,432,386 A | * | 7/1995 | Cerra, Jr. et al. | 307/66 |
| 5,549,984 A | * | 8/1996 | Dougherty | 429/61 |
| 5,633,572 A | * | 5/1997 | Steele et al. | 320/2 |
| 5,646,509 A | * | 7/1997 | Berglund et al. | 320/48 |
| 5,652,499 A | * | 7/1997 | Morita et al. | 320/112 |
| 5,666,006 A | * | 9/1997 | Townsley et al. | 307/66 |
| 5,712,553 A | * | 1/1998 | Hallberg | 307/75 |
| 5,739,596 A | * | 4/1998 | Takizawa et al. | 307/66 |
| 5,744,936 A | * | 4/1998 | Kawakami | 320/120 |
| 5,760,570 A | * | 6/1998 | Nagai et al. | 320/162 |
| 5,801,514 A | * | 9/1998 | Saeki et al. | 320/136 |
| 5,804,891 A | * | 9/1998 | Marman et al. | 307/66 |
| 5,872,984 A | * | 2/1999 | Berglund et al. | 395/750.08 |
| 5,886,503 A | * | 3/1999 | McAndrews et al. | 320/121 |
| 5,905,361 A | * | 5/1999 | Saeki et al. | 320/119 |
| 5,909,360 A | * | 6/1999 | Lavin et al. | 363/21 |
| 5,929,593 A | * | 7/1999 | Eguchi | 320/139 |
| 5,939,865 A | * | 8/1999 | McGarth et al. | 320/156 |
| 6,014,009 A | * | 1/2000 | Wierzbicki et al. | 320/107 |
| 6,031,354 A | * | 2/2000 | Wiley et al. | 320/116 |
| 6,051,955 A | * | 4/2000 | Saeki et al. | 320/121 |
| 6,100,665 A | * | 8/2000 | Aldermann | 320/127 |
| 6,121,752 A | * | 9/2000 | Kitahara et al. | 320/122 |
| 6,124,700 A | * | 9/2000 | Nagai et al. | 320/132 |

\* cited by examiner

Primary Examiner—David Wiley
Assistant Examiner—Frantz B. Jean
(74) Attorney, Agent, or Firm—Christopher H. Lynt; Grant A. Johnson

(57) ABSTRACT

A battery backup system has a number of batteries and number of switches interconnecting the batteries to either a high-power load or a low-power load. The batteries are selectively connected in series with each other, or in parallel with each other by the switches. When the batteries are in the parallel configuration they are also connected to power the low-power load, and when in series, to power the high-power load. Between switching from the high-power series configuration to the low-power parallel configuration, a transition phase is provided during which a transition battery powers the low-power load.

19 Claims, 4 Drawing Sheets

SERIES-PARALLEL BATTERY ARRAY CONVERSION

BACKGROUND OF THE INVENTION

1. Field of The Invention

The invention relates to the field of back-up power supplies, and in particular to a continuously powered memory (CPM) backup power system.

2. Background Information

Power supplies having back-up battery circuitry are known, such as uninterruptible power supplies (UPS's). In these power supplies, batteries are switched to provide back-up output power when they are needed, such as upon detection of a electrical utility power outage. Such power supplies are typically used for powering critical equipment, such as computer systems where a power outage could result in an expensive loss of data and/or services.

Standard UPS back-up power support in use with computer systems typically provides enough power for a limited period of continued system operation until the main power is restored. This limited period of time allows for an orderly shut down procedure should main power not be restored, e.g., saving data to disk, sending notifications to other systems, etc. However, as the size, performance, and complexity of computers has increased, the time needed to perform an orderly shut down of the computer after a utility failure is detected, for example, has also increased. It follows that the power requirements have also increased leading to larger and more expensive back-up power supplies.

To protect purchasers of the computer systems from the possible adverse consequences of a power failure, an integrated backup capability was built into a number of computer systems. This integrated backup was designed to protect those users who either do not purchase a UPS system, or who purchase an external UPS but want in addition an integrated failsafe backup mechanism which Will prevent data loss in the event of a main power failure. Integrated back-up may also incorporate a mode referred to as Continuously Powered Memory or Mainstore (CPM) by which, and as the name implies, power is continuously supplied to memory during a power failure after the computer has otherwise shut down.

With CPM, it is assumed that there is not enough time provided by the available back-up power to complete a traditional shut-down operation, i.e., writing changed contents of main storage memory to disk storage. Therefore, the contents of memory are preserved by continuously powering the memory during the power failure.

A proprietary CPM backup procedure in use includes a fixed, i.e., generally not customer alterable, 2-minute high-power (e.g., 3500 W) back-up for "ride-through" and CPM shutdown preparation time, followed by 48 hours, for example, of low-power (e.g., 50 W) back-up for the memory only. The ride-through time is a period of time, e.g., 30 seconds, during which the computer system continues to operate at full load in anticipation that the utility power failure is temporary and can be ridden through until utility power is restored. CPM shutdown preparation operations are launched after the ride-through time has elapsed. After the preparation operations are completed, back-up power is disconnected except that power to the memory is maintained. The memory refresh rate is decreased to reduce the load. The continuous powering of the memory in this latter stage may be referred to as simply "CPM back-up" herein.

This CPM back-up mechanism therefore is required to provide a relatively high-power full load backup of up to several kilowatts of power, for example, for a short period of time (e.g., 2 minutes maximum) for ride-through and CPM shutdown preparation, and then a relatively low-power memory only back-up of a few dozen watts, for example, for a much longer time period (e.g., 48 hours, typically) while memory is continuously powered.

These two different modes of battery powered backup with CPM are currently in use in certain computer systems, e.g. the IBM AS/400 (IBM and AS/400 are registered trademarks of International Business Machines Corporation). By "two modes" is meant the first mode, a high-power backup mode which precedes the second mode, a low-power continuous powered memory (or Mainstore) mode. Examples of such systems are described in copending applications, i.e., Ser. No. 08/988,553, entitled "INTEGRATED UNINTERRUPTIBLE POWER SUPPLY AND CONTINUOUSLY POWERED MEMORY BACKUP SYSTEM" filed Dec. 11, 1997 and Ser. No. 08/831,345, entitled "UNINTERRUPTIBLE POWER SUPPLY PROVIDING CONTINUOUS POWER MAINSTORE FUNCTION FOR A COMPUTER SYSTEM" filed Apr. 1, 1997 (now U.S. Pat. No. 5,872,984), both co-pending applications being assigned to International Business Machines Corporation.

Although one battery array can satisfy both the high-power backup and CPM requirements of some computer systems, many systems, especially those with large main storage complements, have required additional battery arrays in order to satisfy the two distinct backup requirements. Therefore, an external array of batteries has been added to these larger systems to provide CPM backup, incurring considerable additional expense.

In these systems, for continuously powering the memory, the batteries need not be capable of high-rate discharging, but should have large amp-hour capacities. The amp-hour capacity of the battery array is the limiting factor for CPM duration.

Conversely, batteries used for a high-power operation, e.g., the ride-through and CPM shutdown preparation operations, must be capable of high-rate discharges for short periods of time, but need not have large amp-hour capacities. However, batteries that are capable of such high-rate discharges invariably do have relatively large amp-hour capacities. Therefore, after the relatively short, high-power discharge, e.g., 2-minutes, these high-rate discharge batteries typically retain much of their energy, and this energy is available for the relatively long, lower-rate discharge of maintaining the memory contents.

High-voltage serial battery strings are sometimes used for the high-rate discharge backup, e.g., 360 VDC. The 360 VDC provided corresponds approximately to the voltage output from a power supply full-wave rectifier circuit provided with a nominal 220 VAC line voltage input. Therefore, this voltage level simplifies the backup circuitry eliminating the need for a battery booster circuit, for example. Further, a given power can be provided with lower current levels with a higher-voltage source (since power P equals voltage V times current I), reducing so-called $I^2R$ losses due to wire resistances R, for example. However, power supplies that use relatively low battery terminal voltage with a booster stage/PFC (power factor correction) circuit are also known and used.

Because memory devices are low voltage devices, typically 3 VDC, or less, for example, the continuously powered memory only requires a relatively low voltage to maintain the memory devices. However, converting the relatively high battery string voltage to the relatively low memory voltage wastes battery energy in the conversion process due to switching and gate drive losses in the DC-to-DC switched mode power supply switching FET's, which losses are proportional to the Vin supplied.

This conversion inefficiency has contributed to the need for larger batteries through a separate (external) battery pack dedicated to CPM, as noted above, for providing low-power low-voltage memory maintenance for the desired 48 hours, adding to the costs of such systems.

Therefore, a need exists for a way to avoid the inefficiency described above, while providing the high and low back-up power modes required, without the need for separate battery packs. With better efficiency, a longer CPM time could be realized and/or the size of the battery back-up required could be reduced.

SUMMARY OF THE INVENTION

It is, therefore, a principal object of this invention to provide a method and apparatus for providing battery back-up.

It is another object of the invention to provide a method and apparatus that solves the above mentioned problems so that that battery back-up is accomplished more efficiently and less expensively.

These and other objects of the present invention are accomplished by the method and apparatus disclosed herein.

According to an aspect of the invention, switches are provided for converting a battery back-up system output from a relatively higher-voltage, high-power, series battery string output to a relatively lower-voltage, low power, parallel battery output.

According to an aspect of the invention, the switches are low resistance devices, such as metal oxide field effect transistors (MOSFET's).

According to another aspect of the invention, a battery backup system backs-up a first and a second load. A plurality of batteries are interconnected to the loads by a plurality of switches, such that the plurality of batteries are selectively connected to the first load in series with each other, or to the second load in parallel with each other. The switches may advantageously be low ON resistance field effect transistors, for example.

According to another aspect of the-invention, a small transition battery is provided which is switched in to power the second load during a short transition phase in which the batteries are being changed from a series to a parallel connection.

According to another aspect of the invention, the battery back-up system switches are controlled by a switch controller. The switch controller provides a high-power back-up phase during which the plurality of batteries are connected in series to the first load, the transition phase, during which the transition battery is connected to the second load, and a low-power phase during which the plurality of batteries are connected in parallel to the second load.

According to another aspect of the invention, the switch controller is activated and/or controlled by a system power control network.

According to another aspect of the invention, the battery back-up system is disposed to provide back-up to a computer having a power control network, wherein the switch controller is controlled by the power control network to initiate and control battery back-up operation.

According to another aspect of the invention, the switches are divided into groups. Group A switches are disposed to connect respective ones of the plurality of batteries in a series arrangement. Group B switches are disposed to connect respective ones of the plurality of batteries in a parallel arrangement. An X switch is disposed to connect the plurality of batteries to the first load. A Y switch is disposed to connect the plurality of batteries to the second load. A Z switch the transition battery to the second load.

According to another aspect of the invention, the first load is a relatively high-power load, and the second load is a relatively low-power load.

According to another aspect of the invention, the relatively high-power load is a computer power supply, and the relatively low-power load is a continuously powered memory regulator.

According to another aspect of the invention, the computer power supply provides power to operate a computer system including memory, and the continuously powered memory regulator provides power to maintain the contents of the computer system memory during a computer system shut-down.

According to another aspect of the invention, a method of providing a high-power and a low-power battery back-up with a battery back-up unit having a plurality of batteries includes connecting the plurality of batteries in series with an output of the battery back-up unit to provide the high-power battery back-up and connecting the plurality of batteries in parallel with the output of the battery back-up unit to provide the low-power battery back-up.

According to another aspect of the invention, a method of providing a high-power battery back-up, a transition back-up phase, and a low-power battery back-up with a battery back-up-unit having a plurality of batteries and a plurality of switches, includes closing a first group of switches to configure the plurality of batteries in a series array, closing a first load switch to connect the series array of batteries to a first load to begin the high-power battery back-up, closing a transition battery switch to connect a transition battery to a second load, opening the first load switch to disconnect the series array of batteries from the first load to begin the transition back-up phase and end the high-power battery back-up, opening the first group of switches to deconfigure the plurality of batteries from the series array, closing a second group of switches to configure the plurality of batteries in a parallel array, closing a second load switch to connect the parallel array of batteries to the second load, and opening the transition battery switch to disconnect the transition battery from the second load to end the transition back-up phase and begin the low-power battery back-up. During the transition phase, where a memory device is supplied with power during the low-power battery back-up, the refresh rate of the memory device is advantageously reduced.

According to another aspect of the invention, the high-power battery back-up is provided for a relatively short time period on the order of minutes, and the low-power battery back-up can be provided for a relatively longer time period on the order of hours or days.

According to another aspect of the invention, thirty twelve-volt batteries are used to provide a nominal 360-volt terminal voltage at the output when the switches place the batteries in series for the higher-voltage output, and provide a nominal twelve-volt terminal voltage at the output when the switches place the batteries in parallel for the relatively lower-voltage output.

These and other aspects of the invention will become apparent from the detailed description set forth below.

DETAILED DESCRIPTION OF THE PREFERRED EMBODIMENT(S)

The invention will now be described in more detail by way of example with reference to the embodiment(s) shown in the accompanying figures. It should be kept in mind that the following described embodiment(s) are only presented by way of example and should not be construed as limiting the inventive concept to any particular physical configuration.

Figure 1A:
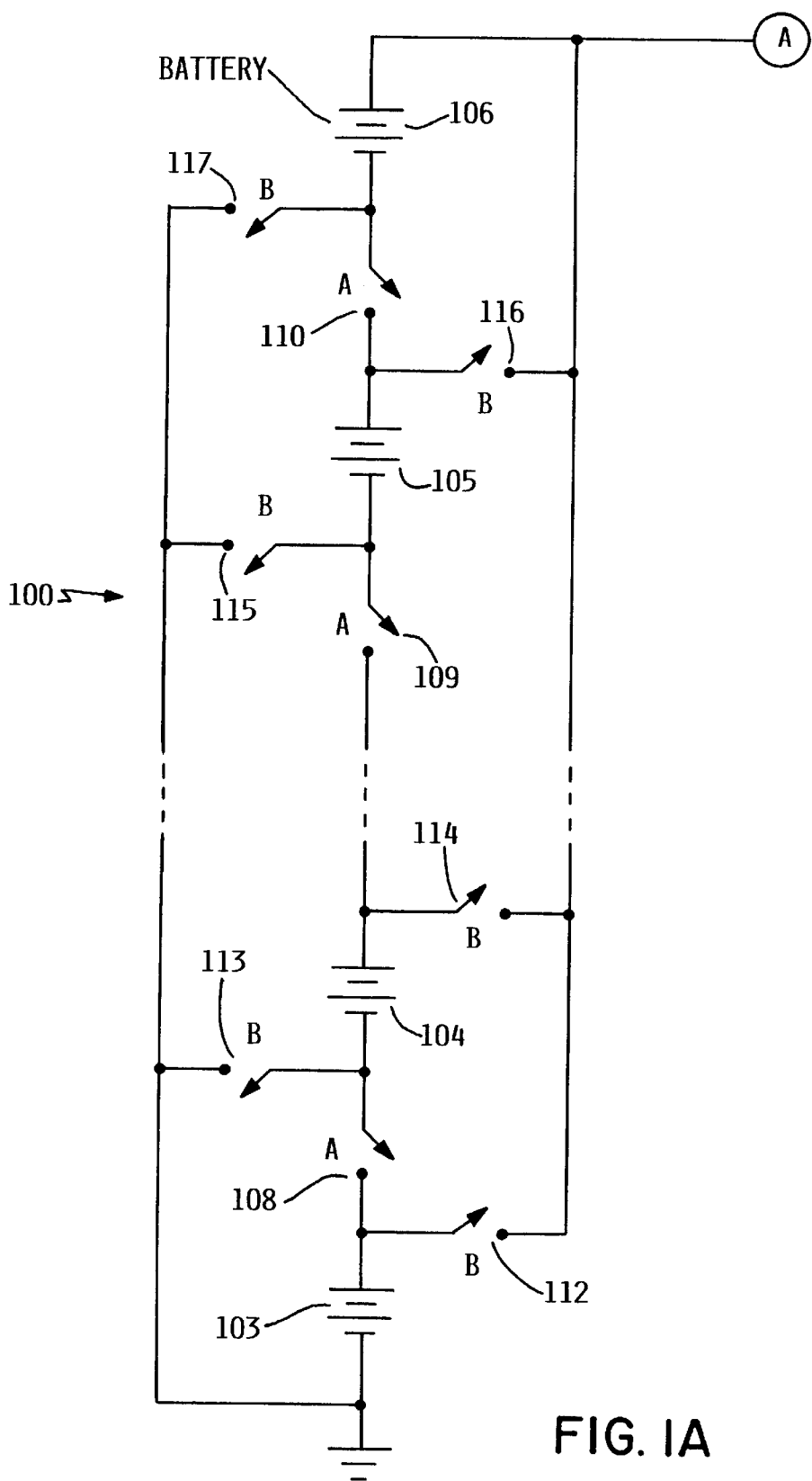
FIG. 1 illustrates an arrangement of a battery string and switches according to an exemplary embodiment of the present invention.
Figure 1B:
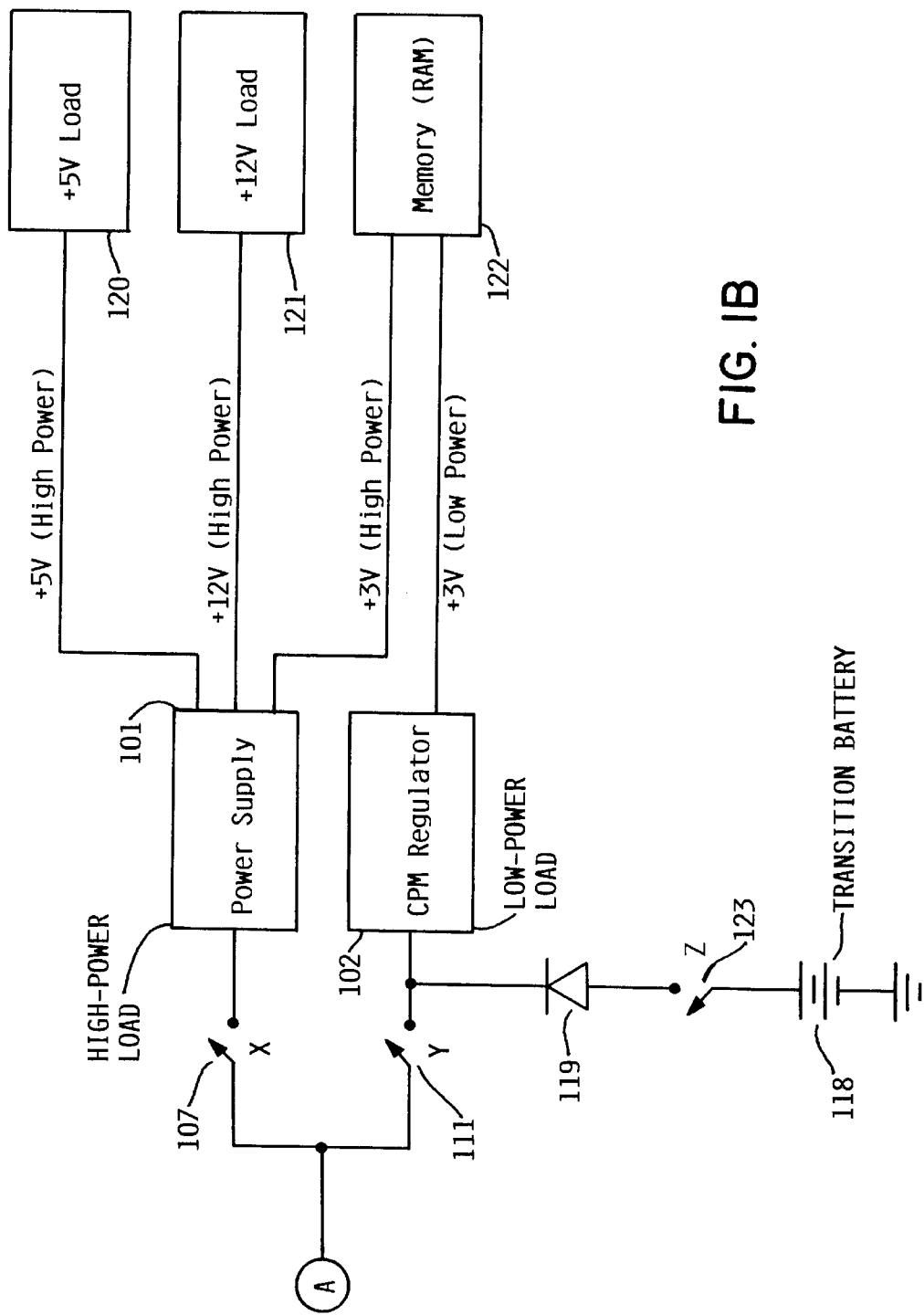

According to an exemplary embodiment of the invention illustrated in FIG. 1, a battery array can be converted from a relatively high-voltage series string for powering a high-power load to a relatively low-voltage parallel connection for powering a low-power load, and vice versa, by means of judiciously placed switches 107 to 117.

The exemplary embodiment of FIG. 1 will now be described in more detail. A high-power load 101, "power supply," and a low-power load 102, "CPM regulator," are provided with power during a back-up procedure from the battery array 100 having batteries 103, 104 . . . 105 and 106 in the illustrated example. Of course, the loads 101,102 could represent other types of electrical device than those shown within the spirit and scope of the invention.

As noted above, in a computer system back-up implementation, the high-power power supply load 101 provides power to the computer system during the ride-through and shutdown preparation activities mode, and the low-power CPM regulator load 102 provides power to the memory devices during a continuously powered memory mode. During CPM back-up, the memory refresh rate would typically be reduced to conserve power. In a typical computer back-up installation, there would be, for example, thirty 12-volt batteries in the battery array 100 providing a nominal series terminal voltage of 360 volts.

As can be seen from FIG. 1, a number of switches 107 to 117 are provided for switching from a series to a parallel battery configuration, and vice versa. With switches 107 to 110 (switches "X" and "A") closed and switches 111 to 117 (switches "Y" and "B") open, a serial connection of batteries 103 to 106 powers power supply load 101. On the other hand, with switches 107 to 110 (switches "X" and "A") open and switches 111 to 117 (switches "Y" and "B") closed, a parallel connection of batteries powers CPM regulator load 102.

Four batteries 103 to 106 are shown for purposes of explanation, however, in an actual installation, a larger number of batteries could be used, e.g., the thirty batteries as mentioned above. The batteries, and their respective switches, would be connected in the same manner as the four batteries and their switches shown in FIG. 1.

The switching between a series connection of batteries and a parallel connection of batteries overcomes the problem of inefficient powering at low voltages due to the losses associated with down conversion from a high voltage, as mentioned earlier, which will now be analyzed in more detail.

For this analysis, it will be assumed that the battery array is a typical computer back-up installation of thirty batteries, and that each battery is a typical 12 V battery with a capacity of 10 Amp-hours. When connected in series, the series connection of batteries powers a 360 V load (e.g., Load A) with a total capacity of 10 Amp-hours. As is well understood in the art, the quantity "10 Amp-hours" means that the batteries can provide 1 ampere of current for 10 hours, or 10 amperes of current for 1 hour. (By definition, 1 Amp-hour is the quantity of electric charge carried past a point in a circuit in 1 hour by a current of 1 ampere. An Amp-hour is, therefore, a measure of the electrical energy capacity of the batteries, and provides an indication of how long they will last under a particular load, assuming they are fully charged.)

A high-power backup load (load 101) of 12 kilowatts lasting for two minutes would remove only about 11% of the energy in each battery. This can be calculated from the following:

12 kilowatts/360 volts=33.3 Amps 2 minutes=$\frac{1}{30}^{th}$ of an hour 33.3 Amps×($\frac{1}{30}^{th}$ hour)=1.11 Amp-hours (1.11 Amp-hours/10 Amp-hours)×100%=11.1%

Because the batteries are in series, the same current is drawn from each and, therefore, the same Amp-hour capacity is depleted from each battery. This, of course, assumes identical batteries fully charged to the same capacity, and ignores the losses due to the switching components, etc.

However, if the low-voltage, low-power backup (i.e., Load B) were powered by the 360 V serial string, the required dc-to-dc conversion (from 360 V to 3 V, for example) might only be 60% efficient, for example. That is, only 60% of the battery capacity would be delivered to the load. Consequently, 40% of the remaining battery energy would be wasted by this inefficiency. For example, a low-power memory load of 50 W would require about 83 W of battery power:

50 Watts/60%=83 Watts

In this case, the approximately 8.9 Amp-hours of remaining battery capacity would be consumed in just under 39 hours:

100%−11%=89%

10 Amp-hours×89%=8.9 Amp-hours

83 Watts/360 volts=0.23 Amps 8.9 Amp-hours/0.23 Amps=38.6 hours

This, of course, assumes an average 360 V series battery string terminal voltage during discharge. The initial voltage of the battery string is generally greater than 360 V with fully charged batteries.

A 48-hour continuously powered memory capability is desirable since this could maintain a mainstore (memory) through a two-day period, e.g., a weekend, until regular power is restored. It should be understood that a battery back-up may be initiated because of a utility failure, or because of a local site circuit failure, or because of a power supply failure, for example. In the latter case, if the failure occurs on a weekend, or at another time when service personnel may be unavailable, or if the failure occurs in a component for which a replacement is not on-hand, a two-day period provides a measure of insurance that important data will not be lost before main power can be restored.

Thus, to obtain the desirable 48-hour low-power continuously powered memory maintenance operation, additional battery capability would be required as can be seen from the above example. Of course, it should also be apparent that a longer CPM back-up time/capability would allow for memory up-grades without falling below the desired CPM time of 48 hours (2 days).

However, advantageously when the battery array 100 is converted from a series string connection to a parallel configuration connection according to the invention, then low-power memory back-up (Load B) can be powered at, for example, 12 V instead of 360 V. At this lower voltage, a higher DC-to-DC conversion efficiency of 85% or more may be reasonably assumed. Thus, at 85% efficiency, a memory load of 50 W would require just under 59 W of battery power:

50 Watts/85%=58.8 Watts

Further, in the parallel configuration of thirty batteries, there are 267 Amp-hours available after the approximately 11% has been consumed by the high-power load:

8.9 Amp-hours×30 batteries=267 Amp-hours

This remaining battery capacity would enable the low-power memory maintenance to continue for just over 54 hours:

58.8 Watts/12 volts=4.9 Amps

267 Amp-hours/4.9 Amps=54.5 hours

This is assuming an average 12 V battery terminal voltage during CPM discharge. It is also assumed that a negligible power is consumed by the switches, which would advantageously be low power devices. In a real installation, less than approximately 50 mW would be dissipated in switches "B" if 30 milli-ohm MOSFET's, for example, are used for switch implementation. Power is also dissipated in switch "Y" if it is also an FET device. Considering the power dissipated in switch "Y" 111 under these circumstances, the switch "Y" 111 connects the parallel battery string to the low-power load 102 and carries the total current of 4.9 A. Therefore, if this switch is also 30 milli-ohm MOSFET, then the power in this one MOSFET switch would be:

$(4.9 \text{ A})^2 \times 30 \times 10^{-3} \Omega = 720$ mW

With 30 parallel batteries, each of the MOSFET switches "B" carry $\frac{1}{30}^{th}$ of the total current 4.9 A=163 mA so their $I^2R$ dissipation is about 800 $\mu$W each. In a 30 battery configuration, there would be 58 switches "B":

58×800 $\mu$W=46 mW

Therefore, the total power dissipation by the switches "Y" and "B" would be about:

720 mW+46 mW=766 mW

Of course, if a single MOSFET is used for switch "Y" 111, this single MOSFET would be required to dissipate the entire 720 mW. However, a preferred alternative would be to use a parallel configuration of MOSFET devices, e.g., four 8 milli-ohm MOSFET's connected in parallel. If these were used for the switch "Y" 111, since each MOSFET carries only $\frac{1}{4}^{th}$ of the total current, the power dissipated in each MOSFET would only be about:

$(8 \times 10^{-3} \Omega \times (4.9 \text{ A}/4)^2) = 12$ mW

Therefore, the total for the four parallel switches would only be about 48 mW. Comparing the power used by all the MOSFET switches to the power used by the memory (50 W), we can see that switch power costs are negligible:

(48 mW+46 mW)=94 mW (94 mW/50 W)×100%=0.2%

Thus, the series-to-parallel conversion according to the invention takes advantage of the improved efficiency of DC-to-DC conversion at lower input voltages, markedly improving, i.e., lengthening, continuously powered memory backup time, even to the point that additional battery capacity or even a separate, external battery pack is not needed to achieve the desirable 48-hour low-power memory backup.

In FIG. 1, the low-power load 102 is a CPM regulator which would receive the 12 VDC from the parallel connected batteries and output a 3 VDC low power output to memory (RAM) 122. The high-power load 101 is a typical computer power supply which receives the 360 VDC from the series battery string and output the normal voltage levels used in a typical computer system, i.e., 5 VDC to a 5 V load 120, 12 VDC to a 12 V load 121 as well as 3 VDC to the memory (RAM) 122.

Figure 2:
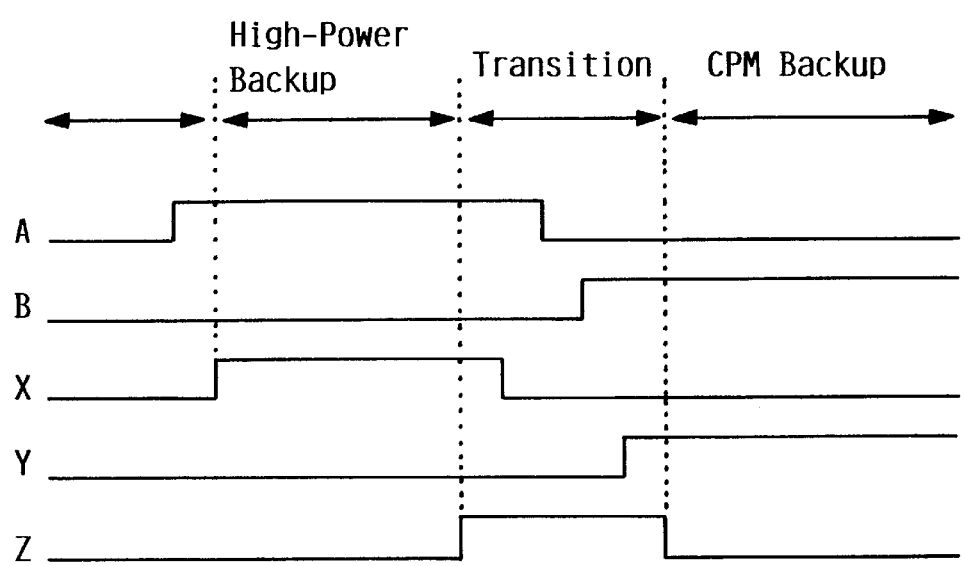
FIG. 2 illustrates a timing diagram of a switching control sequence for the FIG. 1 arrangement according to an exemplary embodiment of the invention.

Some additional design considerations are mentioned for the sake of completeness. The sequence of opening and closing switches A, B, X, Y and Z during the transition from high-power back-up to CPM back-up must be controlled carefully to prevent interrupting power delivery to the CPM load. To this end, as illustrated, a small transition battery 118 is provided, along with a switch "Z" 123 and a protection diode 119. A timing chart for explaining the operation during a change from series to parallel battery configuration is shown in FIG. 2.

When the battery array is switched between series and parallel connection, the load is disconnected (switches 107, 111) and a transition battery 118 is brought on-line through switch "Z" 123. Referring to the timing chart, during a high-power back-up, switches "A" and switch "X" are closed. Before switching to the parallel configuration, during a transition period, the refresh rate of the memory is reduced, switch "Z" 123 is caused to close connecting the transition battery to the diode 119, and then switches "X" and "A" are opened and switches "Y" and "B" are closed.

When switch "Z" is closed, and the diode 119 is forward biased, the diode 119 turns ON and transition battery is connected to the CPM regulator load 102. Power to the memory (RAM) 122 is therefore provided through the CPM regulator 102 powered by the transition battery 118. When switch "X" is opened, power to the power supply 101 is removed. When switches "A" are opened, the batteries are no longer connected in series. When switches "B" are closed, the batteries are connected in parallel. When switch "Y" is closed, the parallel battery connection is connected to the CPM regulator 102. Finally, the switch "Z" is opened removing the transition battery 119 from the input to the CPM regulator 102, ending the transition phase and beginning the CPM back-up phase. The transition battery need not be very large, as it is required to supply the CPM (memory) load for a few seconds, at most.

Figure 3:
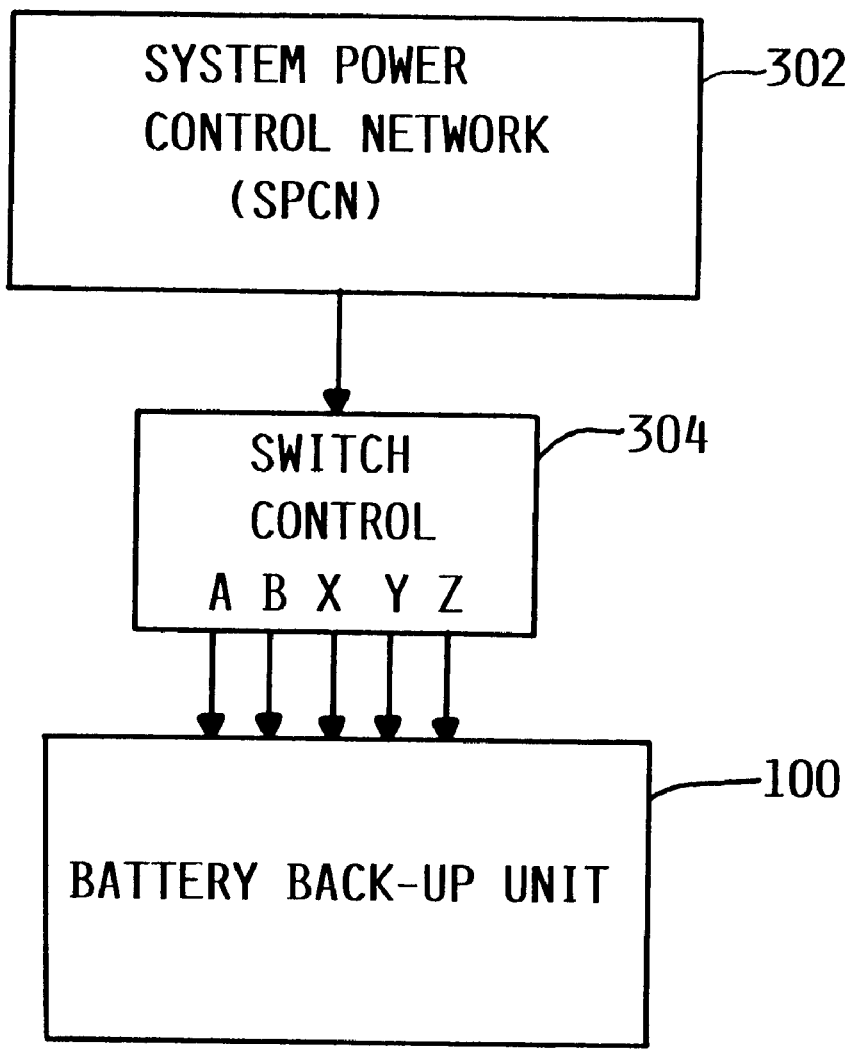
FIG. 3 is a block diagram illustrating an exemplary implementation of switch control for the embodiment of FIGS. 1 and 2.

The controlling of the switching from the series to the parallel output configuration would preferably be done automatically in accordance with a signal indicating that the nominal 2-minute high-power ride-through and CPM shutdown preparation operation has completed, for example. In a computer system, an IBM AS/400 computer system, for example, this signaling could be provided by a system power control network (SPCN) which monitors and controls power supplies and devices in the system. FIG. 3 is a block diagram illustrating an exemplary implementation of switch control for the embodiment of FIGS. 1 and 2.

With reference to FIG. 3, a system power control network (SPCN) 302 initiates and controls a battery back-up operation, e.g., a continuously power memory (CPM) back-up operation, through commands to switch control block 304. Switch control block 304 in turn provides the different switch control signals to the battery back-up unit 100 which control the various switches A, B, X, Y and Z, according to the timing chart described with respect to FIG. 2. Switch control block 304 could be analog or digital logic circuitry, a microprocessor, a programmed logic array, timing circuitry, or the like, as would be apparent to one skilled in the art.

Controlling the switches, e.g., to change from series to parallel battery configuration, could be accomplished-as shown through an SPCN. However, the invention is not limited to a system having an SPCN, and battery back-up and control could be initiated in any number of other ways, as would be apparent to one skilled in the art.

To prevent circuit damage in case of a switch element failure, for example, over-current and/or over-voltage detection and protection would be provided, e.g., a fuse.

It will be apparent to one skilled in the art that the manner of making and using the claimed invention has been adequately disclosed in the above-written description of the preferred embodiments taken together with the drawings.

It will be understood that the above described preferred embodiments of the present invention are susceptible to various modifications, changes, and adaptations, and the same are intended to be comprehended within the meaning and range of equivalents of the appended claims.

For example, besides the low-resistance, low-power consumption MOSFET's used for the switches, any other low ON resistance controllable switching device could be used, for example, relays, DC contactors, reed contact switches, etc., within the spirit and scope of the invention.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

What is claimed is:

1. A battery back-up system for providing battery back-up for a first and a second load, comprising:
   a plurality of batteries;
   a plurality of switches for interconnecting the plurality of batteries to the first load and the second load, such that:
   (a) the plurality of batteries are selectively connected to the first load in series with each other, or
   (b) the plurality of batteries are selectively connected to the second load in parallel with each other; and
   a transition battery to power the second load during a transition phase in which the plurality of batteries are being changed from a series to a parallel connection.

2. The system according to claim 1, wherein the plurality of switches comprise low ON resistance field effect transistors.

3. The system according to claim 1, wherein the transition battery is switched in by at least one switch of the plurality of switches.

4. The system according to claim 3, further comprising a switch controller;
   wherein switching of the plurality of switches is controlled by the switch controller to provide:
   a high-power back-up phase during which the plurality of batteries are connected in series to the first load;
   the transition phase, during which the transition battery is connected to the second load; and
   a low-power phase during which the plurality of batteries are connected in parallel to the second load.

5. The system according to claim 4, wherein the plurality of batteries comprise thirty 12-volt batteries which provide an approximately 360-volt terminal voltage at the output terminals of the battery backup system when connected in series by the plurality of switches, and provide an approximately 12-volt volt terminal voltage at the output terminals of the battery backup system when connected in parallel by the plurality of switches.

6. The system according to claim 5, wherein the plurality of batteries comprise 10 Amp-hour batteries.

7. The system according to claim 4, wherein the battery back-up system is disposed to provide back-up to a computer having a power control network, wherein the switch controller is controlled by the power control network to initiate and control battery back-up operation.

8. The system according to claim 4, wherein the plurality of switches comprise:
   group A switches disposed to connect respective ones of the plurality of batteries in a series arrangement;
   group B switches disposed to connect respective ones of the plurality of batteries in a parallel arrangement;
   an X switch disposed to connect the plurality of batteries to the first load;
   a Y switch disposed to connect the plurality of batteries to the second load; and
   a Z switch disposed to connect the transition battery to the second load.

9. The system according to claim 8, wherein the plurality of switches comprise low ON resistance field effect transistors.

10. A method of switching between a series and a parallel connection of batteries comprising utilizing the system according to claim 1.

11. The system according to claim 1, wherein the first load is a relatively high-power load, and wherein the second load is a relatively low-power load.

12. The system according to claim 11, wherein the relatively high-power load comprises a computer power supply, and wherein the relatively low-power load comprises a continuously powered memory regulator.

13. The system according to claim 12, wherein the computer power supply provides power to operate a computer system including memory, and wherein the continuously powered memory regulator provides power to maintain the contents of the computer system memory during a computer system shut-down.

14. A method of providing a computer system continuously powered memory shut-down comprising utilizing the system according to claim 13.

15. A method of providing a high-power and a low-power battery back-up with a battery back-up unit having a plurality of batteries, comprising:

connecting the plurality of batteries in series with an output of the battery back-up unit to provide the high-power battery back-up; and connecting the plurality of batteries in parallel with the output of the battery back-up unit to provide the low-power battery back-up; and providing a transition phase between the high-power battery back-up and the low-power battery back-up, during which back-up power is supplied to a load from a transition battery.

16. The method according to claim 15, wherein the connecting the plurality of batteries in series comprises closing a first group of switches; and wherein the connecting the plurality of batteries in parallel comprises closing a second group of switches.

17. The method according to claim 15, wherein the low-power back-up is provided to a load comprising a regulator which provides power to a memory device; wherein the method further comprises reducing a refresh rate of the memory device before connecting the plurality of batteries in parallel; and wherein the high-power battery back-up is provided for a relatively short time period on the order of minutes, and wherein the low-power battery back-up can be provided for a relatively longer time period on the order of hours or days.

18. A method of providing a high-power battery back-up, a transition back-up phase, and a low-power battery back-up with a battery back-up unit having a plurality of batteries and a plurality of switches, comprising:

closing a first group of switches to configure the plurality of batteries in a series array;

closing a first load switch to connect the series array of batteries to a first load to begin the high-power battery back-up;

closing a transition battery switch to connect a transition battery to a second load;

opening the first load switch to disconnect the series array of batteries from the first load to begin the transition back-up phase and end the high-power battery back-up;

opening the first group of switches to deconfigure the plurality of batteries from the series array;

closing a second group of switches to configure the plurality of batteries in a parallel array;

closing a second load switch to connect the parallel array of batteries to the second load; and opening the transition battery switch to disconnect the transition battery from the second load to end the transition back-up phase and begin the low-power battery back-up.

19. The method according to claim 18, wherein the second load comprises a regulator providing power to a memory device; wherein the method further comprises reducing a refresh rate of the memory device; and wherein the high-power battery back-up is provided for a relatively short time period on the order of minutes, and wherein the low-power battery back-up can be provided for a relatively longer time period on the order of hours or days.

* * * * *